(12) United States Patent
Lewis et al.

(10) Patent No.: US 9,096,466 B2
(45) Date of Patent: Aug. 4, 2015

(54) PARTICULATE FLOW ENHANCING ADDITIVES AND ASSOCIATED METHODS

(75) Inventors: Sam Lewis, Duncan, OK (US); Rita McKinley, Duncan, OK (US); Russell Fitzgerald, Waurika, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 841 days.

(21) Appl. No.: 11/689,688

(22) Filed: Mar. 22, 2007

(65) Prior Publication Data
US 2008/0229979 A1  Sep. 25, 2008

(51) Int. Cl.
| | | |
|---|---|---|
| C04B 7/13 | (2006.01) |
| C04B 24/04 | (2006.01) |
| C04B 28/02 | (2006.01) |
| C04B 40/00 | (2006.01) |
| C09K 8/467 | (2006.01) |
| C04B 103/30 | (2006.01) |
| C04B 111/00 | (2006.01) |

(52) U.S. Cl.
CPC ............. *C04B 28/02* (2013.01); *C04B 40/0039* (2013.01); *C09K 8/467* (2013.01); *C04B 2103/34* (2013.01); *C04B 2111/00146* (2013.01)

(58) Field of Classification Search
CPC .................................. C04B 7/13; C04B 24/04
USPC .................................................. 106/724, 823
See application file for complete search history.

(56) References Cited

U.S. PATENT DOCUMENTS

| | | | | |
|---|---|---|---|---|
| 3,615,785 A | | 10/1971 | Moorer et al. ................... 106/90 |
| 3,862,044 A | * | 1/1975 | Christopher et al. ......... 507/203 |
| 4,495,228 A | * | 1/1985 | Cornwell ................... 427/385.5 |
| 4,607,066 A | * | 8/1986 | Barry et al. ..................... 523/130 |
| 5,020,598 A | * | 6/1991 | Cowan et al. ................... 166/293 |
| 5,346,550 A | * | 9/1994 | Kunzi et al. ..................... 106/709 |
| 5,447,198 A | * | 9/1995 | Kunzi et al. ..................... 166/293 |
| 6,170,575 B1 | | 1/2001 | Reddy et al. .................. 166/293 |
| 6,245,142 B1 | * | 6/2001 | Reddy et al. .................. 106/724 |
| 6,379,456 B1 | * | 4/2002 | Heathman et al. ............ 106/724 |
| 6,457,524 B1 | | 10/2002 | Roddy .......................... 166/293 |

(Continued)

FOREIGN PATENT DOCUMENTS

| | | |
|---|---|---|
| EP | 1 157 977 A1 | 11/2001 |
| EP | 1 728 771 A2 | 6/2006 |

(Continued)

OTHER PUBLICATIONS

Halliburton Energy Services, Inc., *EZ-FLO Blending Additive*, Product Specifications Data Sheet, 2003.

(Continued)

*Primary Examiner* — Paul Marcantoni
(74) *Attorney, Agent, or Firm* — McDermott Will & Emery LLP; Craig W. Roddy

(57) ABSTRACT

Compositions that may improve the flow properties of dry particulate cementitious and non-cementitious materials, and methods of synthesis and use, are provided. In one embodiment, the methods may comprise providing a flow enhancing additive comprising a flow inducing chemical, a solid adsorbent particulate material, ethylene glycol, and water; providing a cementitious material, a non-cementitious material, or a mixture of cementitious and non-cementitious material; and blending the flow enhancing additive with the cementitious material, the non-cementitious material, or the mixture of cementitious and non-cementitious material.

16 Claims, 2 Drawing Sheets

(56) References Cited

U.S. PATENT DOCUMENTS

| | | | |
|---|---|---|---|
| 6,478,869 B2 | 11/2002 | Reddy et al. | 106/724 |
| 6,494,951 B1 * | 12/2002 | Reddy et al. | 106/705 |
| 6,610,139 B2 | 8/2003 | Reddy et al. | 106/724 |
| 6,660,080 B2 | 12/2003 | Reddy et al. | 106/724 |
| 7,459,017 B2 * | 12/2008 | Ortalano et al. | 106/493 |
| 2004/0063588 A1 * | 4/2004 | Rose et al. | 507/103 |
| 2004/0188092 A1 | 9/2004 | Santra et al. | 166/291 |
| 2008/0229980 A1 | 9/2008 | Lewis | |

FOREIGN PATENT DOCUMENTS

| | | |
|---|---|---|
| GB | 1 302 136 | 1/1973 |
| WO | WO 99/52979 | 10/1999 |

OTHER PUBLICATIONS

U.S. Appl. No. 11/689,716, filed Mar. 22, 2007, "Particulate Flow Enhancing Additives and Associated Methods", Sam Lewis, et al.

PCT International Search Report for Related Foreign Application, Sep. 15, 2008.

PCT Written Opinion of the International Searching Authority for Related Foreign Application, Sep. 15, 2008.

Rebsdat, S. & Mayer, D., "Ethylene Glycol," Ullmann's Encyclopedia of Industrial Chemistry, Wiley-VCH Verlag GmbH & Co. KGaA, Weinheim, Jun. 2006.

Office Action for U.S. Appl. No. 11/689,716 dated Jan. 14, 2010.

Office Action for U.S. Appl. No. 11/689,716 dated Jun. 28, 2010.

* cited by examiner

PARTICULATE FLOW ENHANCING ADDITIVES AND ASSOCIATED METHODS

CROSS-REFERENCE TO RELATED APPLICATIONS

The present invention is related to co-pending U.S. patent application Ser. No. 11/689,716, entitled "Particulate Flow Enhancing Additives and Associated Methods," filed concurrently herewith, the entire disclosure of which is incorporated herein by reference.

BACKGROUND

The present invention generally relates to additives for particulate materials, such as cementitious materials and non-cementitious materials. More specifically, the present invention relates to compositions that may improve the flow properties of dry particulate cementitious and non-cementitious materials and related methods of synthesis and use.

Cementitious materials such as hydraulic cements, slag, fumed silica, fly ash and the like having various particle size distributions are often dry-blended and placed in storage tanks. The storage tanks containing the cementitious materials are often transported by land or sea to locations where the cementitious materials are to be used. During such transportation, the cementitious materials are subjected to vibrations and as a result, under static conditions, the materials can become tightly packed. When the cementitious materials are conveyed out of the storage tanks, significant portions of the tightly packed materials may unintentionally be left behind in the storage tanks or clumps of the packed materials may become lodged in transfer conduits. Beyond the cost of the unusable cementitious materials, costly removal and disposal procedures may be required to remove the packed materials from the storage tanks or transfer conduits.

Treatments have been developed to reduce the likelihood that cementitious and non-cementitious materials will pack by improving or preserving the flow properties of the materials. Certain treatments involve blending dry particulate cementitious and/or non-cementitious materials with an additive. One such additive comprises a particulate solid adsorbent material having a flow inducing chemical adsorbed thereon. In general, these additives are dry-blended with cementitious and/or non-cementitious materials at a point in time before packing is likely to occur, e.g., before the materials are shipped or stored. Typically, the dry-blending step occurs at a location other than the location where the cementitious or non-cementitious materials are ultimately utilized. For example, an additive may be dry-blended with cementitious materials in a warehouse before the blend is transported to a second location where it is used in a cementing operation.

While additives comprising a flow inducing chemical adsorbed onto a particulate solid adsorbent material may improve the flow properties of cementitious and non-cementitious materials, certain undesirable properties of the additives may complicate or limit their use. In particular, known additives may conglomerate and/or freeze at relatively high temperatures. For example, the additives may begin to conglomerate at temperatures as high as 60° F. In other cases, additives may freeze at temperatures as high as 55° F. When completely frozen, an additive may lose its free-flowing, powder-like consistency and take the form of a solid, rock-like mass. This may be a tremendous disadvantage, because until the temperature of the additive can be raised, it may be difficult or impossible to dry-blend the additive with cementitious or non-cementitious materials. Typically, an additives' low freezing point may be most problematic prior to the point when the additive is dry-blended with another material, e.g. when the additive is still in a relatively pure form. Due to the low freezing point of some additives, in cold climates the additives may have to be produced and/or stored in climate-controlled facilities, e.g., climate-controlled warehouses. If climate-controlled facilities are not available or are not cost effective, the additives may freeze and become at least temporarily unusable, because they cannot be dry-blended with cementitious or non-cementitious materials in a frozen state. In some cases, the freezing points of the individual components of the additive may be even higher than the freezing point of the finished additive, e.g., certain components may have freezing points above 60° F., so the components may freeze while the additive is being manufactured, making it difficult or impossible to produce the finished additive.

SUMMARY

The present invention generally relates to additives for particulate materials, such as cementitious materials and non-cementitious materials. More specifically, the present invention relates to compositions that may improve the flow properties of dry particulate cementitious and non-cementitious materials and related methods of synthesis and use.

In one embodiment, the present invention provides compositions comprising: a particulate solid adsorbent material; a flow inducing chemical; water; and ethylene glycol.

In another embodiment, the present invention provides methods comprising: providing a flow enhancing additive comprising a flow inducing chemical, a solid adsorbent particulate material, ethylene glycol, and water; providing a cementitious material, a non-cementitious material, or a mixture of cementitious and non-cementitious material; and blending the flow enhancing additive with the cementitious material, the non-cementitious material, or the mixture of cementitious and non-cementitious material.

In another embodiment, the present invention provides methods comprising: providing a cementitious material, a non-cementitious material, or a mixture of cementitious and non-cementitious material comprising a flow enhancing additive, wherein the flow enhancing additive comprises a flow inducing chemical, a solid adsorbent particulate material, ethylene glycol, and water; allowing the cementitious material, non-cementitious material, or the mixture of cementitious and non-cementitious material to interact with a sufficient amount of water to form a pumpable slurry; and placing the pumpable slurry in a subterranean formation.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
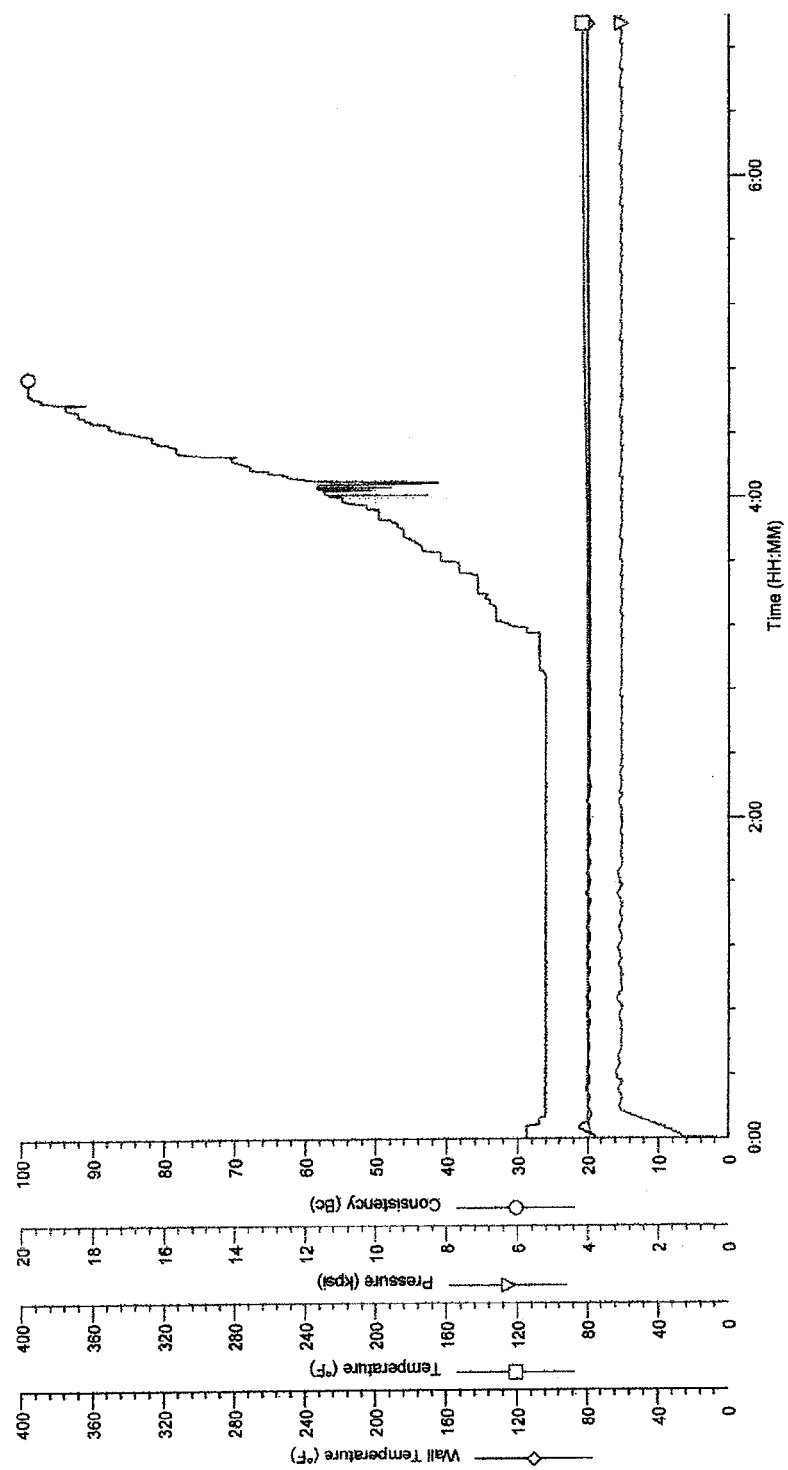
FIG. 1 shows the change in the viscosity of a cement slurry over time.
Figure 2:
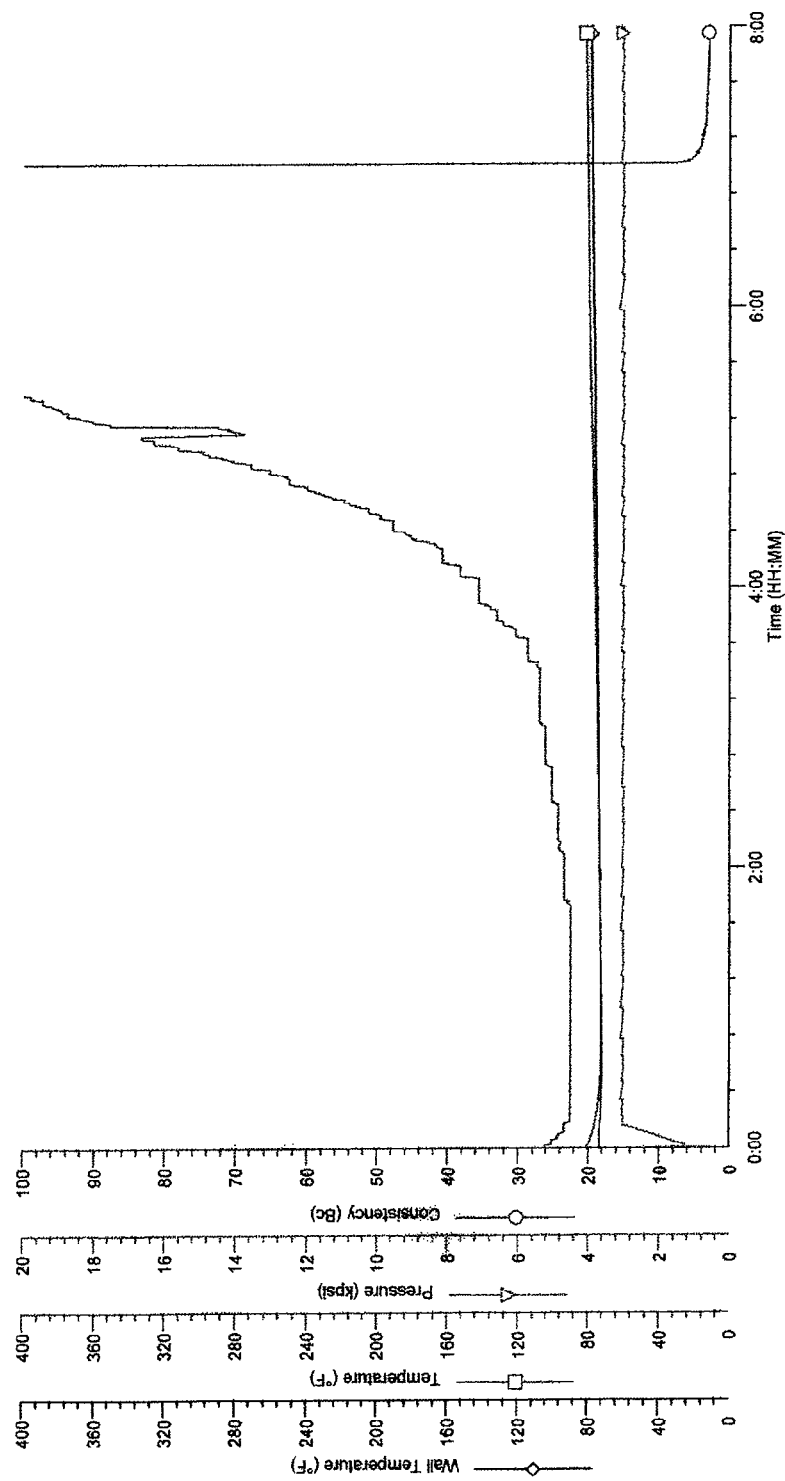
FIG. 2 shows the change in the viscosity of a cement slurry over time.

The present invention generally relates to additives for particulate materials, such as cementitious materials and non-cementitious materials. More specifically, the present invention relates to compositions that may improve the flow properties of dry particulate cementitious and non-cementitious materials and related methods of synthesis and use.

In some aspects, the present invention relates to additives for cementitious and non-cementitious materials and related methods of using cementitious and non-cementitious materials which comprise these additives. In some embodiments, the present invention generally provides compositions that may impart desired flow properties to dry particulate cementitious materials, non-cementitious materials, or a mixture of a cementitious and non-cementitious materials. These compositions are broadly referred to herein as "flow enhancing additives." In some embodiments, the flow enhancing additives of the present invention may have a lower freezing point than previously known flow enhancing additives. Of the many potential advantages of the flow enhancing additives of the present invention, one advantage may be that the freezing point of the flow enhancing additives may be downwardly adjustable to a desired temperature by varying the relative amounts of the substances that make up the additives. One benefit of a depressed freezing point may be that the flow enhancing additive may be stored at temperatures at which previously known additives conglomerate or freeze into a solid mass. In particular, the need for climate-controlled storage of concentrated forms of the flow enhancing additives may be eliminated.

The flow enhancing additives of the present invention may comprise a particulate solid adsorbent material, a flow inducing chemical, ethylene glycol, and water.

Particulate solid adsorbent materials that are suitable for use in the flow enhancing additives of the present invention may comprise any particulate adsorbent solid that does not negatively interact with other components of the flow enhancing additive. In preferred embodiments, suitable particulate solid adsorbent materials are capable of adsorbing the flow inducing chemical(s) utilized in the flow enhancing additive. Examples of such adsorbent materials include, but are not limited to, precipitated silica, zeolite, talcum, diatomaceous earth fuller's earth, derivatives thereof, and combinations thereof. Of these, precipitated silica is presently preferred. One example of a commercially available precipitated silica that is suitable for use in the flow enhancing additives of the present invention is available under the tradename "Sipemat-22™" from Degussa GmbH of Dusseldorf, Germany.

Flow inducing chemicals that are suitable for use in the present invention may comprise any chemical that interacts or reacts with cementitious and/or non-cementitious materials in such a way that a relative increase in the flow properties of the cementitious and/or non-cementitious materials may be observed. In certain embodiments, preferred flow inducing chemicals produce polar molecules. While the ability of the flow inducing chemicals to increase the flow properties of cementitious and non-cementitious materials is not fully understood (and therefore not wanting to be limited to any particular theory), it is believed that in the case of flow inducing chemicals that produce polar molecules, the polar molecules react or interact with components of the cementitious and/or non-cementitious materials (e.g., tricalcium silicate) to create a particle repulsion effect in the cementitious and/or non-cementitious materials. Examples of suitable flow inducing chemicals include, but are not limited to, organic acids such as alkyl and/or alkene carboxylic acids and sulfonic acids, salts of the foregoing acids formed with weak bases, acid anhydrides such as sulfur dioxide, carbon dioxide, sulfur trioxide, nitrogen oxides and similar compounds, derivatives thereof, and combinations thereof. In preferred embodiments, the flow inducing chemical is adsorbed onto the particulate solid adsorbent material utilized in the flow enhancing additive. One preferred flow inducing chemical for use in accordance with the present invention is glacial acetic acid. In some embodiments, certain particulate solid adsorbent materials, e.g., some zeolites, may serve as suitable flow inducing chemicals by reducing the tendency of the cementitious or non-cementitious materials to pack. In a subset of those embodiments, the solid adsorbent material utilized in the flow enhancing additive may serve a dual-function as the solid adsorbent material and the flow inducing chemical. In the embodiments in which the solid adsorbent material serves a dual function, the flow inducing chemical may not be adsorbed onto the solid adsorbent material, because the solid adsorbing material and the flow inducing chemical are one in the same. In some embodiments, the ability of particulate solid adsorbent materials to reduce packing of cementitious and/or non-cementitious materials may be the result of the formation of a solid crystal lattice structure between the particulate materials.

According to certain embodiments of the present invention, the weight ratio of particulate solid adsorbent material to flow enhancing chemical in the flow inducing additive is generally in the range of from about 90:10 to about 10:90, more preferably in the range of from about 75:25 to about 25:75. Other ranges may be suitable as well. In one exemplary embodiment, the particulate solid adsorbent material and the flow enhancing chemical are present in approximately equal amounts by weight.

The water used in the flow enhancing additives of the present invention may comprise fresh water, saltwater (e.g., water containing one or more salts dissolved therein), brine, seawater, or combinations thereof. Generally, the water may be from any source, provided that it does not contain components that might adversely affect the stability and/or performance of the additives of the present invention.

Ethylene glycol may be present in the flow enhancing additive in an amount ranging from about 10% to about 150% by weight of the water present in the flow enhancing additive. According to some embodiments, the ethylene glycol may be present in an amount ranging from about 10% to about 100% by weight of the water. In some embodiments, the total combined amount of ethylene glycol and water present in the flow enhancing additive is an amount sufficient to lower the freezing point of the flow enhancing additive to a desired temperature. The relative amounts of ethylene glycol and water and/or the total combined amount of ethylene glycol and water present in the flow enhancing additive may depend upon a number of factors, including the flow inducing chemical utilized in the flow enhancing aditive, the particulate solid adsorbent material utilized in the flow enhancing additive, the relative amounts of flow inducing chemical to particulate solid adsorbent material, the freezing points of the particulate solid adsorbent material and the flow enhancing chemical in the absence of ethylene glycol and water, and the desired freezing point of the flow enhancing additive. A person of ordinary skill in the art may be able to appreciate the relative amounts of ethylene glycol and water and/or the total combined amounts of ethylene glycol and water necessary to lower the freezing point of the flow enhancing additive to a desired temperature.

In some embodiments, the flow enhancing additives of the present invention may have a lower freezing point than combinations of similar amounts of particulate solid adsorbent material and flow inducing chemical in the absence of water and ethylene glycol. Although the mechanism by which the freezing point of a flow enhancing additive of the present invention is depressed is not fully understood, it is thought that the water present in the flow enhancing additive may form hydrogen bounds with the flow inducing chemical so that the freezing point of the flow inducing chemical is lowered. In addition, the ethylene glycol may interact with the water to lower the freezing point of the water. It is believed that this system of interactions is responsible for depressing the overall freezing point of the flow enhancing additive.

In certain embodiments, the flow enhancing additives of the present invention are dry-blended with cementitious materials. Generally, the cementitious material may be any cementitious material that is suitable for use in cementing operations. Cementitious materials that are suitable for use in the present invention include, but are no limited to, hydraulic cements, slag, fumed silica, fly ash, mixtures thereof, and the like. A variety of hydraulic cements are suitable for use, including those comprising calcium, aluminum, silicon, oxygen, and/or sulfur, which may set and harden by reaction with water. Such hydraulic cements include, for example, Portland cements, pozzolanic cements, gypsum cements, high alumina content cements, silica cements, high alkalinity cements, slag cements, Sorel cements, cement kiln dust, vitrified shale, derivatives thereof, and combinations thereof. As referred to herein, the term "fly ash" refers to the finely divided residue that results from the combustion of ground or powdered coal and is carried by the flue gases generated thereby. "Cement kiln dust," as that term is used herein, refers to a partially calcined kiln feed which is typically removed from the gas stream and collected in a dust collector during the manufacture of cement. In certain preferred embodiments, the cementitious material comprises a hydraulic cement that comprises a Portland cement.

In some embodiments, the flow enhancing additives of the present invention are dry-blended with non-cementitious materials. Non-cementitious materials suitable for use in the present invention include any non-cementitious materials which would not adversely interact with the flow enhancing additives of the present invention. Particularly suitable non-cementitious materials include non-cementitious materials which have a tendency to demonstrate reduced flow properties over some period of time in the absence of a flow enhancing additive. Examples of suitable non-cementitious materials for use with the flow enhancing additives of the present invention include, but are not limited to, barite, bentonite, lost circulation materials, tensile strength enhancers, elastomers, metal oxides, gypsum, derivatives thereof, combinations thereof, and the like.

Any suitable method for making the flow enhancing additives of the present invention may be employed. As an example, in another aspect, the present invention provides methods of making a flow enhancing additive having a depressed freezing point comprising adsorbing a flow inducing chemical on a particulate solid adsorbent material, providing ethylene glycol and water in the presence of the flow inducing chemical, and allowing the water to interact with the flow inducing chemical and the ethylene glycol.

According to some embodiments of the methods of making a flow enhancing additive, one or more of the flow inducing chemical, ethylene glycol, and water may be premixed before the mixture is exposed to the particulate solid adsorbent material. For example, according to some embodiments, the flow inducing chemical, ethylene glycol, and water are premixed and then the mixture is exposed to particulate solid adsorbent materials so that the flow inducing chemical adsorbs onto the particulate solid adsorbent materials. According to certain other embodiments, the flow inducing chemical is first exposed to the particulate solid adsorbent material, and ethylene glycol and water are later added and evenly distributed therein. For example, ethylene glycol and water may be added to a pre-made flow enhancing composition. One example of a suitable pre-made flow enhancing composition is commercially available under the tradename "EZ-FLO" from Halliburton Energy Services, Inc. of Duncan, Okla.

Still another aspect of the invention provides methods of using a flow enhancing additive to improve the flow properties of cementitious and/or non-cementitious materials comprising: providing a flow enhancing additive comprised of a flow inducing chemical, a solid adsorbent particulate material, ethylene glycol, and water; providing a cementitious material, a non-cementitious material, or a mixture of cementitious and non-cementitiou material; and blending the flow enhancing additive with the cementitious material, the non-cementitious material, or the mixture of cementitious and non-cementitious material. According to some embodiments, the amount of flow enhancing additive blended with the cementitious or non-cementitious material is an amount in the range of from about 0.005% to about 5% by weight of the cementitious or non-cementitious materials, more preferably in the range of from about 0.01% to about 1%, and most preferably in an amount in the range of from about 0.02% to about 0.5%. One of ordinary skill in the art will recognize the appropriate amount to use for a chosen application. In certain embodiments, the amount of flow enhancing additive blended with the cementitious and/or non-cementitious material is an amount sufficient to improve or preserve the flow properties of the material after a period of storage in a storage tank.

The flow enhancing additives of the present invention may be dry-blended with cementitious and/or non-cementitious materials through any method known in the art to be suitable for dry-blending. In preferred embodiments, the flow enhancing additive is dry-blended with cementitious and/or non-cementitious materials by boxing the materials. In general, boxing comprises alternating between blowing portions of cementitious and/or non-cementitious materials and portions of flow enhancing additive into a common container. The contents of the common container are then transferred from the common container to a second container. In some embodiments, the contents are then repeatedly transferred from container to container so that a relatively homogenous mixture of flow enhancing additive and cementitious and/or non-cementitious materials is achieved. In preferred embodiments, the contents of the second container are transferred back to the common container, then back to the second container, and so forth, until the material has been transferred at least four times.

In some embodiments, after cementitious and/or non-cementitious materials are dry-blended with a flow enhancing additive of the present invention, the blend may be stored in storage tanks without substantial deterioration of the flow properties of the cementitious and/or non-cementitious materials or the undesirable consequences of the flow enhancing additive freezing. In certain embodiments, after a period of storage in a storage tank, the blend may be conveyed from the storage tank by mechanical or pneumatic means without unintentionally leaving a significant portion of the blend in the storage tank. The term "significant portion" is defined herein to mean a portion of the stored blend that is above 15% of the total volume thereof.

It has also been discovered that after dry-blending a cementitious and/or non-cementitious material with a flow enhancing additive of the present invention and placing the resulting blend in a storage tank, if the tank is closed to the atmosphere and the blend is aged in the closed storage tank for a time period in the range of from about one half a day to about four days, the particulate blend is more readily and easily conveyed out of the storage tank.

According to some embodiments of the methods of the present invention, after a flow enhancing additive is blended with a cementitious and/or non-cementitious material, an amount of water sufficient to form a pumpable slurry may be added to the blend. In certain embodiments, the pumpable slurry may be placed in a subterranean formation. The pumpable slurry may be placed in the subterranean formation in conjunction with a subterranean cementing operation or another subterranean treatment. Any means known in the art for placing a slurry into a subterranean formation may be suitable for use in the present invention, including, but not limited to, pumping, injecting, flowing, and hydrajetting.

Some embodiments of the present invention comprise the steps of providing a cementitious and/or non-cementitious material comprising a flow enhancing additive, wherein the flow enhancing additive further comprises a flow inducing chemical adsorbed onto a solid adsorbent particulate material, ethylene glycol, and water; allowing the cementitious or non-cementitious material to interact with a sufficient amount of water to form a pumpable slurry; and placing the cementitious and/or non-cementitious material in a subterranean formation.

To facilitate a better understanding of the present invention, the following examples of certain aspects of some embodiments are given. In no way should the following examples be read to limit, or define, the entire scope of the invention.

EXAMPLE 1

To determine whether a flow enhancing additive comprising a flow inducing chemical adsorbed onto a solid adsorbent material, ethylene glycol, and water might have a depressed freezing point compared to similar additives comprising only a flow inducing chemical adsorbed onto a solid adsorbent material, experimental samples were prepared in 300 mL bottles, the bottles were secured with a lid, and stored in a 10° F. freezer as follows: Sample 1, representing a control sample, contained 30 grams of EZ-FLO obtained from Halliburton Energy Services of Duncan, Okla. The bottle was placed in the freezer overnight and froze into a solid, rock-like mass. Upon thawing, the sample regained its free-flowing properties. Sample 2 was prepared by placing 30 grams of EZ-FLO (from the same batch used to prepared Sample 1), 5 grams of water, and 1.5 grams of ethylene glycol in a bottle and hand shaking to evenly distribute the materials. After one night in the freezer, Sample 2 remained free flowing. Sample 2 was returned to the freezer, and after two more days (three total days of cold-storage), the flow properties of Sample 2 were visibly unchanged. To prepare Sample 3, 30 more grams of EZ-FLO were added to the three day-old Sample 2, and the materials were combined through hand shaking. After 24 hours in the freezer, most of Sample 3 was still free flowing, but some material stuck to the sides of the container.

EXAMPLE 2

To explore whether flow enhancing additives comprising a flow inducing chemical adsorbed onto a solid adsorbent material, ethylene glycol, and water would improve the flow properties of cementitious materials when the flow enhancing additives and cementitious materials were dry-blended together, a standard pack set index was created.

As shown in Table 1, Samples 1 and 3 contained only Portland cement and no additives. Samples 2, 4, and 5 contained additive in an amount weighing about 0.07% of the weight of the cement. The cements used in the samples were Class G Portland cements purchased from the Norcem Cement Company of Norway and Dykerhoff AG of Germany. The composition of the additives varied according to the sample. The additive that was used in Sample 2 was pure EZ-FLO product obtained from Halliburton Energy Services, Inc. of Duncan, Okla. The additive that was used in Sample 4 was prepared by mixing 30 grams of EZ-FLO product with 6 grams of a 30% ethylene glycol solution (i.e., 30% ethylene glycol by weight of the water present in the ethylene glycol solution). The additive that was used in Sample 5 was prepared by mixing 30 grams of EZ-FLO product with 6 grams of a 50% ethylene glycol solution The ability of the samples to resist packing was tested by a placing a volume of each sample sufficient to achieve a packed thickness of approximately ¾ inch in a 200 mL sealed flask. The cement blend was swirled in the flask until a level cement surface was obtained. The flask containing the cement blend was then placed on a Model J-1 A SYNTRON JOGGER vibrating machine and vibrated for a pre-determined period at a set voltage. After the vibration period, the flask containing the cement blend was removed from the vibrator and placed on a rotator that slowly rotated the flask in a vertical plane. The flask was continuously rotated for the number of counts required for the cement blend in the flask to show initial and then complete separation between the particles of the blend. After the cement blend decompacted, the flask containing the cement blend was shaken vigorously and the cement blend was re-swirled for 5 seconds whereupon the test was repeated. This procedure was repeated for a total of three or 4 tests, as indicated in Table 2, which shows the results of each test. All tests were performed at room temperature.

TABLE 1

| Sample No. | Cement | Components of Additive (Additive is added to Cement in an amount of about .07% by weight of the Cement) | % ethylene glycol in the ethylene glycol solution | Rotations | Rotations until Initial Separation | Rotations until Complete Separation |
|---|---|---|---|---|---|---|
| 1 | Class G - Norcem | — | — | 25 seconds at 57 Volts | 24<br>28<br>27 | 26<br>32<br>30 |

TABLE 1-continued

| | Make-up of Sample | | | | | |
|---|---|---|---|---|---|---|
| Sample No. | Cement | Components of Additive (Additive is added to Cement in an amount of about .07% by weight of the Cement) | % ethylene glycol in the ethylene glycol solution | Rotations | Rotations until Initial Separation | Rotations until Complete Separation |
| 2 | Class G - Norcem | Pre-made EZ-FLO | — | 25 seconds at 57 Volts | 8<br>6<br>8 | 9<br>8<br>10 |
| 3 | Class G - Norcem | — | — | 23 seconds at 48 Volts | 19<br>19<br>18 | 25<br>30<br>19 |
| 4 | Class G - Dykerhoff | 30 g Pre-made EZ-FLO<br>6 g ethylene glycol solution | 30% | 23 seconds at 48 Volts | 10<br>7<br>12<br>13 | 14<br>9<br>15<br>16 |
| 5 | Class G - Dykerhoff | 30 g Pre-made EZ-FLO<br>6 g ethylene glycol solution | 50% | 23 seconds at 48 Volts | 10<br>11<br>10<br>7 | 15<br>16<br>11<br>8 |

The same procedure was performed on samples containing additives that did not contain pre-made EZ-FLO product. As seen in Table 2, Samples 6 and 9 contained only Class G cement. Samples 7, 8, 10 and 11 contained additive in an amount weighing about 0.07% by weight of the cement. These additives were prepared "from scratch," using glacial acetic acid, particulate silica, and either a 30% or 50% ethylene glycol solution. The particulate silica used in the samples is available under the tradename "Sipemat-22™" from Degussa DmbH of Germany. As shown in Table 2, these components were hand-mixed to prepare the additives used in Sample 7 and Sample 8, and blended together in a blender to prepare the additives used in Sample 10 and Sample 11. The results of each test are shown in Table 2.

TABLE 2

| | Make-up of Sample | | | | | |
|---|---|---|---|---|---|---|
| Sample No. | Cement | Components of Additive (Additive is added to Cement in an amount of about .07% by weight of the Cement) | % ethylene glycol in the ethylene glycol solution | Rotations | Rotations until Initial Separation | Rotations until Complete Separation |
| 6 | Class G - Norcem | — | — | 25 seconds at 57 Volts | 23<br>22<br>25 | 27<br>37<br>29 |
| 7 | Class G - Norcem | Hand-mixed:<br>15 g glacial acetic acid<br>15 g particulate silica<br>6 g ethylene glycol solution | 30% | 25 seconds at 57 Volts | 9<br>8<br>7<br>7 | 12<br>11<br>10<br>9 |
| 8 | Class G - Dykerhoff | Hand-mixed:<br>15 g glacial acetic acid<br>15 g particulate silica<br>6 g ethylene glycol solution | 50% | 25 seconds at 57 Volts | 12<br>6<br>4<br>3 | 14<br>9<br>6<br>5 |
| 9 | Class G - Norcem | — | — | 25 seconds at 57 Volts | 25<br>24<br>21 | 29<br>31<br>32 |
| 10 | Class G - Dykerhoff | Mixed in blender:<br>15 g glacial acetic acid<br>15 g particulate silica<br>6 g ethylene glycol solution | 30% | 25 seconds at 57 Volts | 4<br>4<br>6<br>3 | 6<br>5<br>9<br>7 |
| 11 | Class G - Dykerhoff | Mixed in blender:<br>15 g glacial acetic acid<br>15 g particulate silica<br>6 g ethylene glycol solution | 50% | 25 seconds at 57 Volts | 4<br>4<br>3<br>7 | 6<br>7<br>6<br>8 |

As can be seen from Table 1 and Table 2, all of the samples that contained an additive, whether pure EZ-FLO, EZ-FLO plus ethylene glycol solution, or a from scratch mixture of glacial acetic acid, particulate silica, and ethylene glycol solution, showed reduced packing compared to samples that did not contain an additive.

To determine whether an atomizer would be an effective means to apply a mixture of flow inducing chemical, water, and ethylene glycol to a particulate solid adsorbent sample, comprised only Class G cement. Sample 13 comprised Glass G cement and 0.07% of pre-made EZ-FLO by weight of the cement. Sample 14 was prepared by mixing 150 grams glacial acetic acid with 50 grams of water and 15 grams of ethylene glycol (i.e., a 30% ethylene glycol solution), and placing the mixture in an atomizer. The atomizer was then use to apply this mixture to 150 grams of "Sipemat-22™" precipitated silica that was continuously stirred in a 2 quart blender jar at a rate of 3000 rpm. After all of the acetic acid/water/ethylene glycol mixture was applied to the precipitated silica to create a flow enhancing additive, the flow enhancing additive was added to Glass G cement in an amount of about 0.07% by weight of the cement. The pack set index that was created using samples 12, 13, 14, and 15 is shown in Table 3. As can be seen, in some embodiments, an atomizer may be an effective means for introducing the liquid components of a flow enhancing additive to the solid components of the flow enhancing additive.

TABLE 3

| | Make-up of Sample | | | | | |
|---|---|---|---|---|---|---|
| Sample No. | Cement | Components of Additive (Additive is added to Cement in an amount of about .07% by weight of the Cement) | % ethylene glycol in the ethylene glycol solution | Rotations | Rotations until Initial Separation | Rotations until Complete Separation |
| 12 | Class G - Dykerhoff | — | — | 25 seconds | 27 | 29 |
| | | | | at | 29 | 30 |
| | | | | 57 Volts | 32 | 33 |
| 13 | Class G - Dykerhoff | Pre-made EZ-FLO | — | 25 seconds | 18 | 20 |
| | | | | at | 18 | 21 |
| | | | | 57 Volts | 16 | 17 |
| 14 | Class G - Dykerhoff | 150 g particulate silica | 30% | 25 seconds | 18 | 20 |
| | | 150 g glacial acetic acid | | at | 18 | 20 |
| | | 65 g ethylene glycol solution | | 57 Volts | 16 | 18 |

To determine whether an embodiment of a flow enhancing additive of the present invention would also reduce packing in Class A cement, Samples 15 and 16 were prepared and subjected to the pack set test described above. Sample 15 contained only Joppa Class A cement from LaFarge North America. Sample 16 contained Class A Joppa cement and an additive in an amount weighing about 0.07% by weight of the cement. The additive was prepared by mixing 30 grams of pre-made EZ-FLO product with 6 grams of ethylene glycol solution. The ethylene glycol solution was comprised of water and 30% ethylene glycol by weight of the water. As can be seen from the test results summarized in Table 4, the additive was effective to decrease packing of the Joppa Class A cement.

TABLE 4

| | Make-up of Sample | | | | | |
|---|---|---|---|---|---|---|
| Sample No. | Cement | Components of Additive (Additive is added to Cement in an amount of about .07% by weight of the Cement) | % ethylene glycol in the ethylene glycol solution | Rotations | Rotations until Initial Separation | Rotations until Complete Separation |
| 15 | Class A - Joppa | — | — | 25 seconds | 23 | 25 |
| | | | | at | 27 | 29 |
| | | | | 57 Volts | 17 | 19 |
| 16 | Class A - Joppa | 30 g Pre-made EZ-FLO | 30% | 25 seconds | 12 | 13 |
| | | | | at | 10 | 11 |
| | | 6 g ethylene glycol solution | | 57 Volts | 12 | 14 |
| | | | | | 13 | 14 |

EXAMPLE 3

As a qualitative study of the freezing point of certain flow enhancing additives which comprise a flow inducing chemical adsorbed onto a solid adsorbent material, ethylene glycol, and water, various sample additives were prepared and stored in a 20° F. freezer. In addition to testing the freezing point of the sample additives in the absence of cement, a pack set index was created for each additive as described in Example 2. The samples were prepared as shown in Table 5, in duplicate.

TABLE 5

| | Amount of particulate solid adsorbent material combined with a flow-inducing chemical in a 1:1 weight ratio (grams) | Amount of ethylene glycol solution (grams) | % Ethylene Glycol by weight of water in the ethylene glycol solution |
|---|---|---|---|
| Control Sample | 30 (EZ-FLO) | 0 | 0 |
| Sample 1 | 30 (EZ-FLO) | 6.5 | 30 |
| Sample 2 | 30 (EZ-FLO) | 3.25 | 30 |
| Sample 3 | 30 (EZ-FLO) | 1.625 | 30 |
| Sample 4 | 30 (EZ-FLO) | 6 | 50 |
| Sample 5 | 30 (EZ-FLO) | 3 | 50 |
| Sample 6 | 30 (EZ-FLO) | 1.5 | 50 |
| Sample 7 | 30 (15 g particulate silica + 15 g acetic acid) | 6.5 | 30 |
| Sample 8 | 30 (15 g particulate silica + 15 g acetic acid) | 5 | 50 |

All samples were placed in a sealed jar. At ambient room temperature, all samples were free-flowing like a loose powder. When stored in the freezer overnight, the control sample froze into a solid, rock-like mass. The control sample was allowed to come to room temperature and was then returned to the freezer for two more days. The control sample re-froze as before. Samples 1-5, 7, and 8 (two replicates per sample) all remained free-flowing after being placed in the freezer overnight. After one night in the freezer, the samples were allowed to come to room temperature and then returned to the freezer. At the conclusion of two more days, the samples were still free-flowing. One replicate of Sample 6 showed signs of partial freezing after both storage periods, i.e., irregular clumps were observed in the jar. The other replicate of Sample 6 never showed any signs of freezing. It is thought that the unusual results from the first replicate of Sample 6 may have been due to an incomplete mixing or uneven distribution of its component materials. The pack set tests performed on the samples showed that all of the sample mixtures were effective to reduce the tendency of cement to pack.

EXAMPLE 4

To compare the gelation of a cement slurry comprising cement, water and pure EZ-FLO additive to the gelation of a cement slurry comprising cement, water, EZ-FLO, and an ethylene glycol solution, two sample cement slurries were prepared. Slurry 1 contained 700 grams of a standard cement, 325.9 grams of water, and 0.5 grams of EZ-FLO. Slurry 2 contained 700 grams of a standard cement, 325.9 grams of water, and 0.5 grams of a mixture of EZ-FLO and ethylene glycol solution, wherein the mixture of EZ-FLO and ethylene glycol solution was prepared by combining 30 grams of EZ-FLO and 6 grams of a solution of water and 30% ethylene glycol by weight of the water. In general, the procedures used to test the gelation properties of the samples conformed to the procedures described in the API publication entitled "Well Stimulation Thickening Time Test." The slurries were analyzed for at least 6 hours with a Model 7222 CHANDLER consistometer. Within about the first 10 minutes of the test, the temperature of the slurries was adjusted to about 80° F. and the pressure was adjusted from an initial pressure of about 1000 psi to about 3000 psi. The temperature and pressure were then kept relatively constant for the duration of the test. Over time, the viscosity of both slurries, as measured in Bearden units (Bc), increased sharply. Therefore, according to this embodiment, the presence of ethylene glycol in Slurry 2 did not prevent a desirable increase in the viscosity of the slurry over time.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method of producing a dry, free-flowing cement composition comprising:
   providing flow inducing particulates that comprise solid adsorbent particulates having adsorbed thereon a flow inducing chemical, ethylene glycol, and water;
      wherein the water is present in an amount from about 5-30.3% by weight of the solid adsorbent particulates; and,
      wherein the ethylene glycol is present in an amount from about 3.25-20% by weight of the solid adsorbent particulates;
   dry blending the flow inducing particulate with dry cement particles to produce a dry, free-flowing cement composition;
      wherein the flow inducing particulate is present in an amount from about 0.005% to about 5% by weight of the cement; and,
      wherein the dry, free-flowing cement composition can be stored at temperatures at least as low as 10° F. and remain free-flowing.

2. The method of claim 1 wherein the solid adsorbent particulates comprises at least one material selected from the group consisting of: fumed silica, precipitated silica, zeolite, talcum, diatomaceous earth, barite, bentonite, slag, fly ash, an elastomer, a metal oxide, gypsum, fuller's earth, hydraulic cement, and combinations thereof.

3. The method of claim 1 wherein the flow inducing chemical is selected from the group consisting of an organic acid, an alkyl carboxylic acid, an alkene carboxylic acid, a sulfonic acid, a salt of the foregoing acids formed with a weak base, an acid anhydride, or a combination thereof.

4. The method of claim 1 wherein the flow inducing chemical comprises glacial acetic acid.

5. The method of claim 1 wherein the dry, free-flowing cement composition exhibits improved flow properties when compared to a comparative dry cementitious material that is otherwise identical except that it lacks the flow inducing particulates.

6. The method of claim 1 wherein the flow inducing particulate is present in an amount from about 0.01% to about 1% by weight of the cement.

7. The method of claim 1 wherein the flow inducing particulate is present in an amount from about 0.02% to about 0.5% by weight of the cement.

8. The method of claim 1 wherein the dry, free-flowing cement composition exhibits a depressed freezing point when compared to a comparative dry cementitious material that is otherwise identical except that it lacks the flow inducing particulates.

9. The method of claim 1 which further comprises storing the dry, free-flowing cement composition for a time period in the range of from about one half day to about seven days, wherein the dry, free-flowing cement composition remains free-flowing.

10. A method of producing a dry, free-flowing cement composition comprising:
   providing flow inducing particulates that comprise solid adsorbent particulates having adsorbed thereon a glacial acetic acid, ethylene glycol, and water;
      wherein the water is present in an amount from about 5-30.3% by weight of the solid adsorbent particulates; and,
      wherein the ethylene glycol is present in an amount from about 3.25-20% by weight of the solid adsorbent particulates;
   dry blending the flow inducing particulate with dry cement particles to produce a dry, free-flowing cement composition;
      wherein the flow inducing particulate is present in an amount from about 0.005% to about 5% by weight of the cement; and,
      wherein the dry, free-flowing cement composition can be stored at temperatures at least as low as 10° F. and remain free-flowing.

11. The method of claim 10 wherein the solid adsorbent particulates comprises at least one material selected from the group consisting of: fumed silica, precipitated silica, zeolite, talcum, diatomaceous earth, barite, bentonite, slag, fly ash, an elastomer, a metal oxide, gypsum, fuller's earth, hydraulic cement, and combinations thereof.

12. The method of claim 10 wherein the dry, free-flowing cement composition exhibits improved flow properties when compared to a comparative dry cementitious material that is otherwise identical except that it lacks the flow inducing particulates.

13. The method of claim 10 wherein the flow inducing particulate is present in an amount from about 0.01% to about 1% by weight of the cement.

14. The method of claim 10 wherein the flow inducing particulate is present in an amount from about 0.02% to about 0.5% by weight of the cement.

15. The method of claim 10 wherein the dry, free-flowing cement composition exhibits a depressed freezing point when compared to a comparative dry cementitious material that is otherwise identical except that it lacks the flow inducing particulates.

16. The method of claim 10 which further comprises storing the dry, free-flowing cement composition for a time period in the range of from about one half day to about seven days, wherein the dry, free-flowing cement composition remains free-flowing.

* * * * *